United States Patent [19]

Müller et al.

[11] Patent Number: 4,847,488

[45] Date of Patent: Jul. 11, 1989

[54] SABOTAGE RESISTANT LIGHT BARRIER WHEREIN RADIATION IS POLARIZED INTO TWO OPPOSITE TYPES OF POLARIZATION

[75] Inventors: Kurt Müller; Alfred Wüthrich, both of Stäfa, Switzerland

[73] Assignee: Cerberus AG, Switzerland

[21] Appl. No.: 137,465

[22] Filed: Dec. 23, 1987

[51] Int. Cl.[4] ............................ G02F 1/01; H01J 40/14
[52] U.S. Cl. ...................................... 250/225; 250/221
[58] Field of Search ................... 250/225, 221, 222.1; 340/507, 556, 557

[56] References Cited

U.S. PATENT DOCUMENTS 4,171,908  10/1979  Robert et al. ........................ 250/225
4,224,608   9/1980  Lederer .............................. 340/556
4,339,660   7/1982  Buchholz et al. ................... 250/221

*Primary Examiner*—David C. Nelms
*Assistant Examiner*—William Oen

*Attorney, Agent, or Firm*—Brumbaugh, Graves, Donohue & Raymond

[57] ABSTRACT

In a reflection light barrier, improved security against sabotage is achieved through the simultaneous use of radiation with opposite types of polarization, e.g., by means of radiations polarized linearly perpendicular to one another, or radiations polarized circularly with opposite directions of rotation. The two types of polarization are processed separately by the receiver and when there is any disturbance of the equilibrium between the two types of polarization, a disturbance signal is triggered. Placed in front of the transmitter and reflector are polarizing filters with zones of opposite polarization and with different areas which are tuned to one another in such a way that equilibrium is produced at the receiver. In another variant there is provided, in front of the reflector, a quarter-wave plate which rotates the plane of polarization of the transmitted radiation 90°, and the receiver separately evaluates the two planes of polarization in order to give alarm and disturbance signals.

15 Claims, 1 Drawing Sheet 4,847,488

SABOTAGE RESISTANT LIGHT BARRIER WHEREIN RADIATION IS POLARIZED INTO TWO OPPOSITE TYPES OF POLARIZATION

BACKGROUND OF THE INVENTION

The invention relates to a light barrier with a transmitter, a reflector and a radiation receiver, in which optical means are provided for beaming the radiation emitted by the transmitter to the reflector and for beaming the radiation reflected by the reflector to the receiver, as well as additional means for polarizing the radiation.

So-called reflection light barriers, in which the radiation is directed from the transmitter to the receiver via a reflector and any decrease in the intensity of the radiation received as a result of an interruption of the path of radiation between the transmitter, reflector and receiver is utilized, by an appropriate analyzing circuit, for putting out an alarm signal are known for example, from German Patent Specification No. 1,934,321 or German Patent Specification No. 2,014,107. The reflector is for the most part in the form of a so-called bull's-eye (cat's eye) with a number of tetrahedral elements which, independently of the inclination, at all times reflect the incident radiation precisely in the direction of incidence, so that the transmitter and receiver can be placed in close proximity and connecting lines between the transmitter and receiver can be dispensed with.

It is also possible, however, to provide several reflectors, between which the radiation is thrown back and forth, so that a laminar protective curtain is created.

In principle, it is possible to use as radiation any desired electromagnetic radiation that can be beamed by optical means, such as light, for example. In order for a light barrier, or rather, its protective beam, not to be readily detectable, it is preferable that the light barrier is made of invisible radiation, and in particular, infrared radiation, which for the purposes of the invention, is included in the concept of light radiation.

In the event that no suitable security precautions have been taken, it is easy to outwit and sabotage such light barriers by irradiating the receiver by means of a substitute transmitter with radiation of the same wavelength. With a view toward remedying this and toward making light barriers more safe against sabotage, attempts have been made to codify the radiation intensity, for example as a pulse train with a specified frequency, or to work with polarized radiation, as for example by placing a polarizing filter in front of the transmitter and the receiver, or through the use of a radiation source emitting polarized radiation. Even such light barriers, however, can easily be sabotaged and rendered ineffectual by sliding an appropriate substitute reflector, such as an analogous bull's-eye, in front of the radiator and receiver, so that the receiver continues to receive unattenuated radiation, while the interval between the substitute reflector and the light barrier reflector is unprotected and can be passed through by an intruder.

SUMMARY OF THE INVENTION

It is the object of this invention to do away with said drawbacks of the state of the art and, in particular, to create a reflection light barrier which signals any interruption of the path of radiation with greater security, while at the same time it exhibits improved security against sabotage and makes it possible to detect automatically an attempt to render the light barrier ineffectual.

In accordance with the invention, this object is achieved by having the means for polarizing the radiation, set up to polarize the radiation in two opposite types of polarization and by having the radiation receiver designed to detect any change in the relationship between the opposite polarizations in the radiation received.

"Opposite types of polarization" is to be understood to mean, in the case of linear polarization, two planes of polarization perpendicular to one another, e.g., horizontal and vertical, or, in the case of circular polarization, opposite directions of rotations, e.g., right-hand and left-hand.

It is advantageous for the transmitter to have two sensors each of which is sensitive to radiation of one of the two opposite types of polarization and which are placed in a comparator circuit that indicates any change in the ratio of the intensities of the radiation of the two types of polarization. This can involve, for example, a difference detector circuit from which the output signal is normally zero but differs from zero in the event of a disturbance or sabotage.

In a first advantageous embodiment of the invention, the means of polarization have disposed immediately in front of the reflector, a polarizing filter with zones of different types of polarization which is passed through twice by the light-barrier radiation and creates a specific ratio of intensities between the two types of polarization in the received radiation. Masking with an analogously filtered substitute reflector without any disturbance of the ratio of intensities is extremely difficult.

It is advantageous if the surfaces of the zones of opposite polarization of the filter or the intensities of the radiation fractions of differing polarization are different. It is particularly advantageous if the radiation emitted by the transmitter is polarized in two opposite types of polarization, for example by means of a polarization filter that is likewise divided into zones of opposite types of polarization and is placed in front of the transmitter and the ratios of the areas of the zones of the two polarizing filters in front of the transmitter and in front of the reflector are different. In such an arrangement the ratios of the areas can be selected so that they are inverse with respect to one another in such a way that, while indeed the intensity of the radiations of opposite polarization in the radiation falling on the sensors is equal, in the event of attempted sabotage, by inserting a reflector into the light barrier, a disruption of the equilibrium inevitably occurs.

In another embodiment of the invention the means of polarizing the radiation comprises a linear polarizing filter inserted in front of the transmitter and a further optical element inserted before the reflector which rotates the plane of polarization by a given angle and thus creates another type of polarization. It is expedient to form the optical element as a quarter-wave plate which, on the radiation's passing through twice, rotates the plane of polarization 90°. The reflected radiation, then no longer contains anything but radiation polarized perpendicularly to the original plane of polarization, the absence of which signals an alarm. The appearance in the reflected signal of radiation having the original polarization, furthermore, inevitably points to attempted sabotage. The analyzing circuit can thus be designed in a particularly simple manner.

BRIEF DESCRIPTION OF THE DRAWINGS

The invention will be explained in greater detail by means of the embodiments illustrated in the figures, in which.

DETAILED DESCRIPTION OF THE PREFERRED EMBODIMENT

Figure 1:
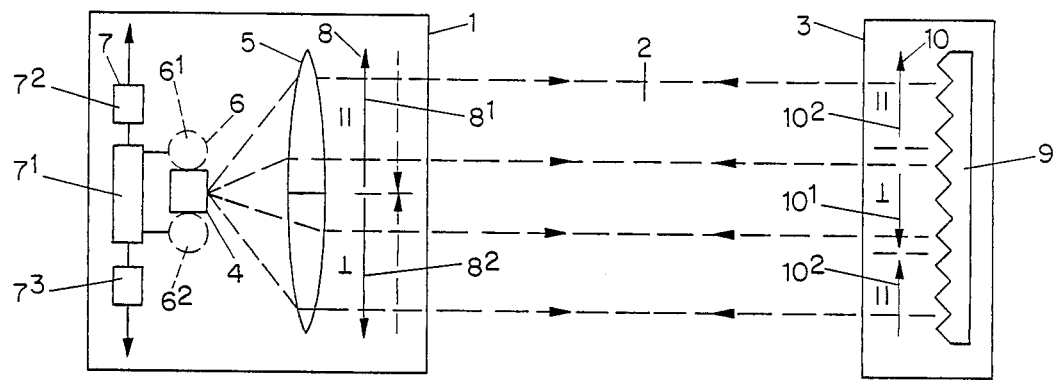
FIG. 1 shows a block diagram of a reflection light barrier.

In the block diagram of the reflection light barrier illustrated in FIG. 1, a transmitter/receiver unit 1 transmits electromagnetic radiation, for example in the infrared range of the spectrum, over a surveillance tract 2 to a reflection unit 3 which reflects the radiation and echoes it back to the transmitter/receiver unit 1, where the intensity of the returning radiation is determined. Upon the penetration of an object into the surveillance tract 2, the radiation is attenuated or interrupted and the decrease in intensity of the returning radiation is utilized to trigger an alarm signal.

The transmitter/receiver unit comprises a transmitter 4, for example an LED, and an optical means, such as a convergent lens 5 made of glass or transparent plastic, for beaming the radiation of the transmitter 4 into the surveillance tract 2 and to the reflection unit 3. Placed in close proximity to the transmitter 4 is a radiation receiver 6 having two adjacent sensor elements $6^1$, $6^2$ which are connected to an analyzing circuit 7. These can also be set up separately from the transmitter/receiver unit 1.

The transmitter/receiver unit 1 further comprises means for the polarization of the transmitted radiation in the form of a polarizing filter 8. As illustrated, this can either be placed on the front side of the unit 1 or constitute its front end plate. However, it may also be placed between transmitter 4 and lens 5, or the lens 5 itself may be made of polarizing material. This polarizing filter 8 consists of a number of zones $8^1$, $8^2$ with opposite types of polarization. For example, one zone $8^1$ can polarize the radiation parallel thereto, i.e., in the vertical plane, while the other zone $8^2$ polarizes it perpendicularly thereto, i.e., in the horizontal plane.

The reflector unit 3 comprises a reflector 9 which echoes back the incident radiation in the same direction. It is advantageous for the reflector to be made up of tetrahedral elements which always reflect the incident radiation back in the direction of incidence regardless of the angle of inclination, so that adjustment problems are done away with.

In front of the reflector 9, also, are disposed means of polarization 10, which again comprise zones $10^1$, $10^2$ with opposite types of polarization, e.g., parallel and perpendicular to the plane. Here, too, the polarizing filter 10 can serve as an end plate.

The means of polarization 8 and the optical beaming means 5 in the transmitter/receiver unit 1 are designed and arranged in such a way that each of the two sensor elements $6^1$, $6^2$ receives only radiation of one of the two opposite types of polarization: e.g., sensor $6^1$ receives only parallel-polarized radiation and sensor $6^2$ receives only perpendicularly polarized radiation. The analyzing circuit connected to the two sensors $6^1$, $6^2$ is set up to detect and evaluate any change in the ratio of the intensities of the two opposite types of polarization in the received radiation. In the simplest case the two sensor elements $6^1$, $6^2$ can for that purpose be connected up to a comparator circuit $7^1$ which detects any difference in the output signals of the sensor elements $6^1$, $6^2$ and reports it, by means of a signal circuit $7^2$, as a disturbance or sabotage attempt. Also provided is an alarm circuit $7^3$ which uses a drop in the intensity of at least one of the two output signals to give an alarm signal. Upon any interruption of the surveillance tract 2, by an object penetrating into it, an alarm signal will be triggered. Upon any attempt to render the surveillance tract 2 ineffectual by slipping a substitute reflector into the path of the rays, in an effort to maintain the irradiation of the receiver 6 intact, the preset equilibrium between the two types of polarization in the received radiation will nearly always be disrupted: i.e., the intensity ratio will be changed and a disturbance signal will be triggered.

Figure 2:
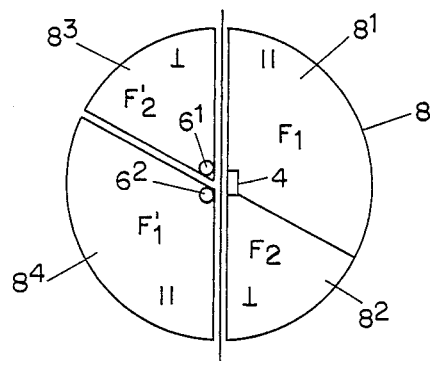
FIG. 2 shows a filter arrangement in front of the transmitter and receiver.
Figure 3:
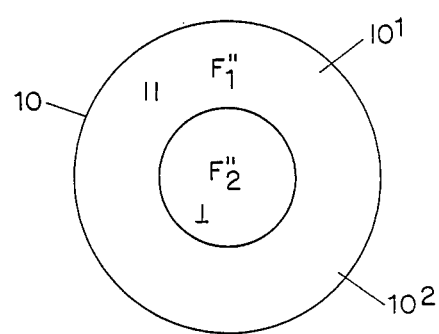
FIG. 3 shows a filter arrangement in front of the reflector.

FIG. 2 shows the division of a particularly advantageous polarizing filter 8 in the transmitter/receiver unit 1 and FIG. 3 shows an appropriate polarizing filter 10 in the reflector unit 9. The part of the filter 8 on the transmitter side is divided into two sectors $8^1$, $8^2$ of opposite polarization with an unequal ratio of areas $F_1/F_2 = \sqrt{x}$. Accordingly, the ratio of the intensities of the two types of polarization in the transmitted radiation is likewise $\sqrt{x}$. The half of the filter 8 on the receive side also comprises two unequal sectors, preferably with the same ratio of areas $F_1'/F_2' = \sqrt{x}$, in which one sector $8^3$ conducts only perpendicularly polarized radiation to the sensor $6^1$ and the other sector $8^4$ conducts only parallel-polarized radiation to the sensor $6^2$. To prevent any direct irradiation from the transmitter 4 to the receiver 6, a radiation-shield separating wall 11 is provided between the two. The filter 10 on the reflector side also comprises two zones of opposite types of polarization, shown in the example illustrated in FIG. 3 as two concentric ring-shaped areas $10^1$, $10^2$. The ratio of the areas in relation to the filter on the transmitter/receiver side is advantageously selected as $F_1''/F_2'' = 1/x$. In consequence of this selection of the ratios of the areas of the three polarizing filters, after the radiation changes intensity ratio three times on passing through the three filters to the sensor elements $6^1$, $6^2$, there results a ratio of $I_1/I_2 = \sqrt{x} \cdot (1/x) \cdot \sqrt{x} = 1$ for the received radiation intensity with opposite polarization, i.e., the difference signal = 0.

With a light barrier of this type, therefore, under undisturbed conditions, both sensor signals are in fact present, but the comparator circuit does not detect any difference signal. Thus neither an alarm signal nor a disturbance signal is given. If, however, the light barrier is interrupted, both sensor signals drop to zero and an alarm signal is triggered. In the event of an attempted sabotage by sliding a mirror or bull's-eye into the path of the radiation, the change in polarization effected by the polarizing filter 10 located on the reflector side is eliminated, so that the intensity ratio of the received radiation becomes $I_1'/I_2' = \sqrt{x} \cdot \sqrt{x} = x$, and thus different from 1. Thus a disturbance signal is triggered, indicating a sabotage attempt. Even if the nature of the polarizing filters used in the light barrier or their area ratios were known and an analogously filtered reflector was used for a sabotage attempt, at the point when it was slipped into the radiation the intensity ratio would be altered at least for a short time and a disturbance would be signaled.

In another embodiment of the invention, the division of the filter surfaces into zones of different polarization can also be effected in another way. In order for the specified advantageous effect to be achieved, at least one of the polarizing filters should be designed asymmetrically, preferably the filter on the reflector side. The asymmetry can consist of an unequal ratio of the areas of the zones, unequal radiation absorption capacity of the zones, or the use of the radiation characteristic and corresponding geometric filter division, so long as a change in the intensity of the two types of polarization with respect to one another is achieved. On the receiver side, the comparator circuit $7^1$ can be constructed in such a way that during the undisturbed condition of the light barrier, it can be tuned to a particular value, and any deviation from that value will produce, an imbalance.

Figure 4:
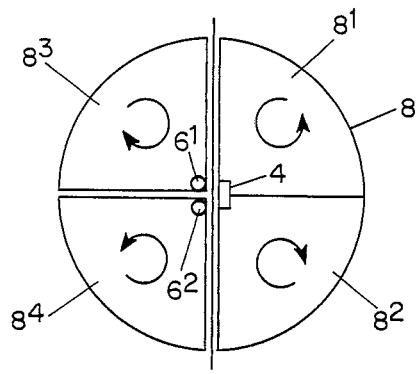
FIG. 4 shows another embodiment of a filter arrangement in front of the transmitter and receiver.
Figure 5:
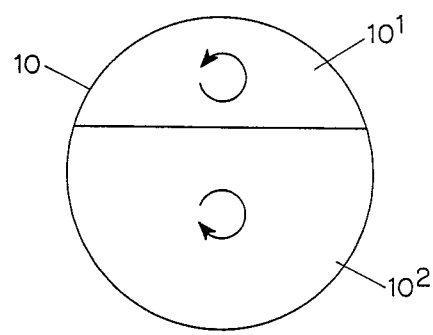
FIG. 5 shows another embodiment of a filter arrangement in front of the reflector.

FIGS. 4 and 5 show embodiments of polarizing filters 8 and 10 in front of the transmitter, receiver and reflector in which, instead of linear polarization, circular polarization takes place. Here again, each of the three filters is divided into zones of opposite types of polarization; in other words, zones $8^1$, $8^4$ and $10^2$ polarize the radiation left-hand circularly and zones $8^2$, $8^3$ and $10^1$ polarize the radiation right-hand circularly. Here, too, it is again advantageous if asymmetry of the intensities of the radiation of opposite polarization is provided for in an appropriate manner. An advantage with the use of such circularly polarizing filters is that setting the directions of polarization and matching the three polarizing filters to one another, as must necessarily be done in the case of linear polarizing filters, is not required. The problem of having to make adjustments at sites remote from one another, is thus avoided from the outset.

Figure 6:
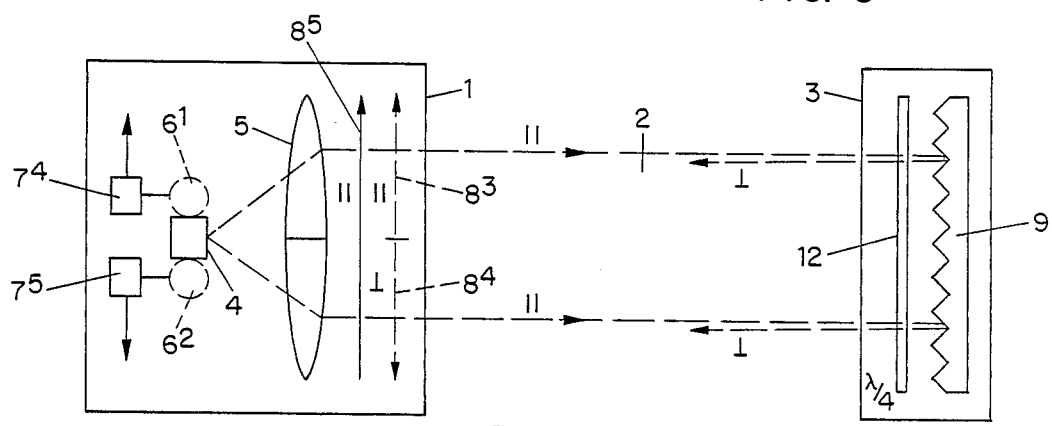
FIG. 6 shows a block diagram of another embodiment of a light barrier.

Represented in FIG. 6 is another advantageous embodiment of a light barrier which differs from the embodiments previously described in that radiation sent out by the transmitter 4 is polarized linearly in only one direction, e.g., parallel, or in the vertical plane, by the polarizing filter $8^5$ placed in front. In front of the reflection there is provided, instead of a polarizing filter, an optical element 12 which modifies the type of polarization of the radiation passing through it. This might, for example, be a quarter-wave plate, as is known in optics, whereby with proper spatial orientation, linearly polarized radiation is transformed into circularly polarized radiation. Upon double passage through this quarter-wave plate 12, the plane of polarization is consequently rotated 90° and the originally parallel-polarized radiation is converted into perpendicularly polarized radiation, i.e. having the opposite type of polarization.

When the light barrier is undisturbed, one receiver $6^1$, in front of which a perpendicularly polarizing filter $8^3$ is connected, continuously receives reflected radiation, while the other receiver $6^2$, in front of which there is placed a parallel-polarizing filter $8^4$, does not pick up any radiation. When the light barrier is interrupted, the radiation at sensor $6^1$ discontinues and an alarm is signaled by means of the signal detector $7^4$. In the event of an attempt to sabotage with a substitute reflector, on the other hand, the quarter-wave plate becomes ineffectual and the other sensor $6^2$ receives radiation, so that a disturbance is reported through the detector circuit $7^5$. Such a light barrier is therefore to a large extent secure against sabotage.

Further embodiments are possible within the concept of the invention. For instance, both of the embodiments described can be combined, with the filter on the reflector side, for example, comprising zones with a specific direction of polarization and also with rotation of the plane of polarization. A light barrier of this type is virtually unsabotageable.

We claim:

1. A light barrier with a transmitter, a reflector and a radiation receiver in which optical means for beaming radiation emitted by the transmitter to the reflector and for beaming radiation reflected by the reflector to the receiver, as well as means for polarizing the radiation, are provided, wherein the improvement comprises that the means for polarizing the radiation is set up to polarize the radiation into two opposite types of polarization and the radiation receiver is designed to detect any change in a ratio of the opposite types of polarization in the received radiation.

2. A light barrier according to claim 1, wherein the radiation receiver comprises two sensors, each of which is sensitive only to radiation of one of the two opposite types of polarization.

3. A light barrier according to claim 2, wherein each of the two sensors, comprises a polarizing filter, each having an opposite type of polarization.

4. A light barrier according to claim 3, wherein effective areas of the polarizing filters of the two sensors are different from one another.

5. A light barrier according to claim 2, wherein the two sensors are connected to one another in a comparator circuit which is capable of triggering a signal when the ratio, or a difference in the output signals of the two sensors deviates from predetermined values.

6. A light barrier according to claim 1, wherein in front of the reflector, and/or in front of the transmitter, there are placed polarizing filters, having zones, with opposite types of polarization.

7. A light barrier according to claim 6, wherein the zones with opposite types of polarization, linearly polarize radiation that passes through in two planes of polarization, perpendicular to one another.

8. A light barrier according to claim 6, wherein the zones with opposite types of polarization circularly polarize radiation passing through with opposite directions of rotation.

9. A light barrier according to claim 6, wherein areas of the zones, with opposite types of polarization, in front of the reflector and/or in front of the transmitter, are different from one another.

10. A light barrier according to claim 4, wherein ratios of the areas of the zones with opposite types of polarization and in the polarizing filters in front of the transmitter, reflector and receiver, are so matched to one another that the two sensors receive radiation of equal intensity.

11. A light barrier according to claim 9 wherein ratios of the areas of the zones with opposite types of polarization and in the polarizing filters in front of the transmitter, reflector and receiver, are so matched to one another that two sensors receive radiation of equal intensity.

12. A light barrier according to claim 1, wherein a linear polarizing filter, having a specified plane of polarization, is placed in front of the transmitter and an optical element rotating a plane of polarization twice in opposite directions, is placed in front of the reflector and the receiver is designed to pick up, separately from one another, radiation polarized in the original plane of polarization and radiation polarized perpendicularly thereto.

13. A light barrier according to claim 11, wherein the receiver, or circuit elements connected to it, are designed to give off a signal whenever the receiver receives radiation with the same plane of polarization as the transmitted radiation with a specified intensity.

14. A light barrier according to claim 11, wherein the optical element is constituted by a quarter-wave plate.

15. A light barrier comprising:
a transmitter;
a reflector;
a radiation receiver designed to detect any change in ratio between opposite types of polarization in received radiation;
optical means for beaming radiation emitted by the transmitter to the reflector and for beaming radiation reflected by the reflector to the receiver; and
polarizing means for polarizing the radiation into two opposite types of polarization.

* * * * *